(12) United States Patent
Wirth et al.

(10) Patent No.: US 8,454,897 B2
(45) Date of Patent: Jun. 4, 2013

(54) EXHAUST GAS-TREATING DEVICE

(75) Inventors: Georg Wirth, Kirchheim/Teck (DE); Silvia Calvo, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 338 days.

(21) Appl. No.: 12/797,129

(22) Filed: Jun. 9, 2010

(65) Prior Publication Data
US 2010/0316537 A1 Dec. 16, 2010

(30) Foreign Application Priority Data
Jun. 10, 2009 (DE) .................. 10 2009 024 535

(51) Int. Cl.
*B01D 50/00* (2006.01)

(52) U.S. Cl.
USPC .......................................... 422/171; 180/177

(58) Field of Classification Search
USPC .......................................... 422/177, 179, 180
See application file for complete search history.

(56) References Cited

U.S. PATENT DOCUMENTS

| | | | |
|---|---|---|---|
| 6,001,314 A * | 12/1999 | Buck et al. ..................... | 422/177 |
| 6,753,294 B1 | 6/2004 | Brisley et al. | |
| 7,097,817 B2 | 8/2006 | Brisley et al. | |
| 7,107,763 B2 | 9/2006 | Suwabe et al. | |
| 7,204,965 B2 * | 4/2007 | Okawara et al. ............... | 422/177 |
| 7,937,933 B2 * | 5/2011 | Doring et al. .................... | 60/286 |
| 2003/0180195 A1 | 9/2003 | Chapman et al. | |
| 2004/0175315 A1 | 9/2004 | Brisley et al. | |
| 2007/0227129 A1 | 10/2007 | Sugihara et al. | |
| 2008/0132405 A1 | 6/2008 | Patchett et al. | |

FOREIGN PATENT DOCUMENTS

| | | | |
|---|---|---|---|
| AT | 504 391 A1 | 5/2008 | |
| DE | 36 86 278 T2 | 3/1993 | |
| DE | 600 20 070 T2 | 1/2006 | |
| DE | 102006051790 A1 | 5/2008 | |
| EP | 1 348 843 A2 | 10/2003 | |
| EP | 1 371 826 A2 | 12/2003 | |
| EP | 1 752 629 A1 | 2/2007 | |
| EP | 1 892 394 A1 | 2/2008 | |
| JP | 2006272157 A | 10/2006 | |
| WO | WO 01/96717 A1 | 12/2001 | |

* cited by examiner

*Primary Examiner* — Tom Duong
(74) *Attorney, Agent, or Firm* — McGlew and Tuttle, P.C.

(57) ABSTRACT

An exhaust gas-treating device (1) for an exhaust system of an internal combustion engine, especially of a motor vehicle, which is provided with an insert (3), which has a plurality of ducts (5, 5'), through which parallel flow is possible. The insert has, in an inflow-side, first section (6), an oxidation catalyst coating, which forms an oxidation catalytic converter (K1). The insert comprises on an outflow-side a second section (7) with a particle filter (K3) with inlet ducts (12) closed on the outflow side and with outflow ducts (13) closed on the inflow side after the first section (6). Greater integration of a plurality of catalyst components of the exhaust gas-treating device (1) is possible.

21 Claims, 3 Drawing Sheets

EXHAUST GAS-TREATING DEVICE

CROSS REFERENCE TO RELATED APPLICATIONS

This application claims the benefit of priority under 35 U.S.C. §119 of German Patent Application DE 10 2009 024 535.9 filed Jun. 10, 2009, the entire contents of which are incorporated herein by reference.

FIELD OF THE INVENTION

The present invention pertains to an exhaust gas-treating device for an exhaust system of an internal combustion engine, especially of a motor vehicle.

BACKGROUND OF THE INVENTION

Exhaust gas-treating devices are usually built by lining up components having different functionalities. For example, an oxidation catalyst, a particle filter, a feed means with an optional mixer, possibly a hydrolysis catalyst, a selective catalytic reduction catalytic converter (SCR catalytic converter) and a blocking catalytic converter are nowadays installed one after another in the exhaust gas flow of an internal combustion engine in a motor vehicle. Unburnt hydrocarbons, hydrogen and carbon monoxide are reacted with oxygen into carbon dioxide and water by the oxidation catalyst in order to extensively free the exhaust gas flow from unburnt hydrocarbons and carbon monoxide. The particle filter filters out soot particles as well as fine dusts that may be present from the exhaust gas of the exhaust gas flow. This particle filter is heated at intervals by heating to the extent that the soot particles retained by the particle filter can react with oxygen to form carbon dioxide. The particle filter is regenerated thereby. A urea-water solution is usually mixed with exhaust gas in the optional mixer via the feed means with an optional mixer, while the water is evaporated at the same time in this case and a fluid, containing very finely dispersed urea or ammonia, is formed. A hydrolysis catalyst may also be used at this point to hydrolyze the urea into ammonia and $CO_2$. The ammonia is needed, in turn, to convert nitrogen oxides possibly formed during the combustion of the fuel in the internal combustion engine on the SCR catalytic converter by selective catalytic reduction (SCR) with ammonia into nitrogen and water. A blocking catalytic converter, which oxidizes excess residues of ammonia from the exhaust gas flow into nitrogen, nitrogen oxides and water, in order to achieve that hardly any residues of ammonia will be released into the environment with the exhaust gas, is usually installed at the end of this lining up of catalytic converters.

In the worst case, this leads to five components in the line, and ceramic catalysts must be mounted at least partially in a metallic housing in four cases. Besides the large space required and the enormous complexity of the overall system, the great heat loss occurring because of the inherently large thermal mass and because of the large surface is counterproductive. Attempts are therefore made even now to combine a plurality of components into multiple components. Thus, a particle filter with an oxidation catalyst coating is now common, in which case the oxidation catalyst coating forms the oxidation catalyst integrated with the particle filter. Furthermore, combinations of hydrolysis, SCR and blocking catalytic converters are known as well. However, there remain nowadays at least three components, which are to be arranged one after another, due to the feed means for the reducing agent.

SUMMARY OF THE INVENTION

The present invention pertains to the object of proposing for the exhaust gas-treating device an improved or at least different embodiment, which is characterized especially by a smaller space requirement, a lower degree of complexity and a smaller number of components.

The present invention is based on the general idea of providing an insert having a plurality of ducts through which parallel flow is possible, in an inflow-side first section at least partly with an oxidation catalyst coating, which forms at least one oxidation catalyst, and of designing an outflow-side, second section as a particle filter with inlet ducts closed on the outflow side and with outlet ducts closed after the first section. Furthermore, at least one feed means for a reducing agent may be optionally provided. The advantage of this mode of construction is the smaller space requirement achieved due to the integration of the particle filter and oxidation catalyst and the reduction of the complexity of the exhaust gas-treating device.

Furthermore, it is possible according to a special embodiment to embody further integrations of at least one SCR catalytic converter and at least one blocking catalytic converter in the exhaust gas-treating device by the at least partial application of an SCR catalyst coating on at least some of the ducts of the second section, especially of the inlet ducts or by the at least partial application of a blocking catalyst coating on the outlet ducts. This leads to a further reduction of the space requirement and complexity.

Furthermore, the exhaust gas-treating device may be provided in another embodiment with lateral recesses, into which the feed means can introduce the reducing agent or a reducing agent-exhaust gas mixture. Such lateral recesses are preferably designed as a hole or milled recess. This integrative mode of construction likewise leads to a smaller space requirement and to a surface radiating less heat.

In an alternative solution, the present invention is based on the general idea of using a particle filter in an exhaust gas-treating device for an exhaust system of an internal combustion engine, especially of a motor vehicle, in which particle filter at least one particle filter element has closed inlet ducts on the outflow side and closed outlet ducts on the inflow side, wherein at least some of the inlet ducts and/or at least some of the outlet ducts are provided at least partly with an SCR catalyst coating, which form at least one SCR catalytic converter. Space is reduced due to this integrative mode of construction, the design is simplified and the number of necessary components is reduced.

Consequently, such an exhaust gas-treating device may have, corresponding to a variant, at least one feed means for a reducing agent. The advantage of this mode of construction is the combination of a particle filter with a feed means. The space requirement and the complexity of such an exhaust gas-treating device can be markedly reduced hereby.

It is likewise possible corresponding to another embodiment to provide only at least some of the inlet ducts at least partly with the SCR catalyst coating and to provide at least some of the outlet ducts at least partly with a blocking catalyst coating, which will then form a blocking catalytic converter for decomposing excess ammonia in the exhaust gas flow. The space requirement and the complexity of the exhaust gas treatment are further reduced hereby.

Further important features and advantages of the present invention appear from the subclaims, from the drawings and from the corresponding description of the figures on the basis of the drawings.

It is obvious that the features mentioned above, which will also be explained below, can be used not only in the particular combination indicated but also in other combinations or alone, without going beyond the scope of the present invention.

Preferred exemplary embodiments of the present invention are shown in the drawings and will be explained in more detail in the following description, where identical reference numbers designate identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
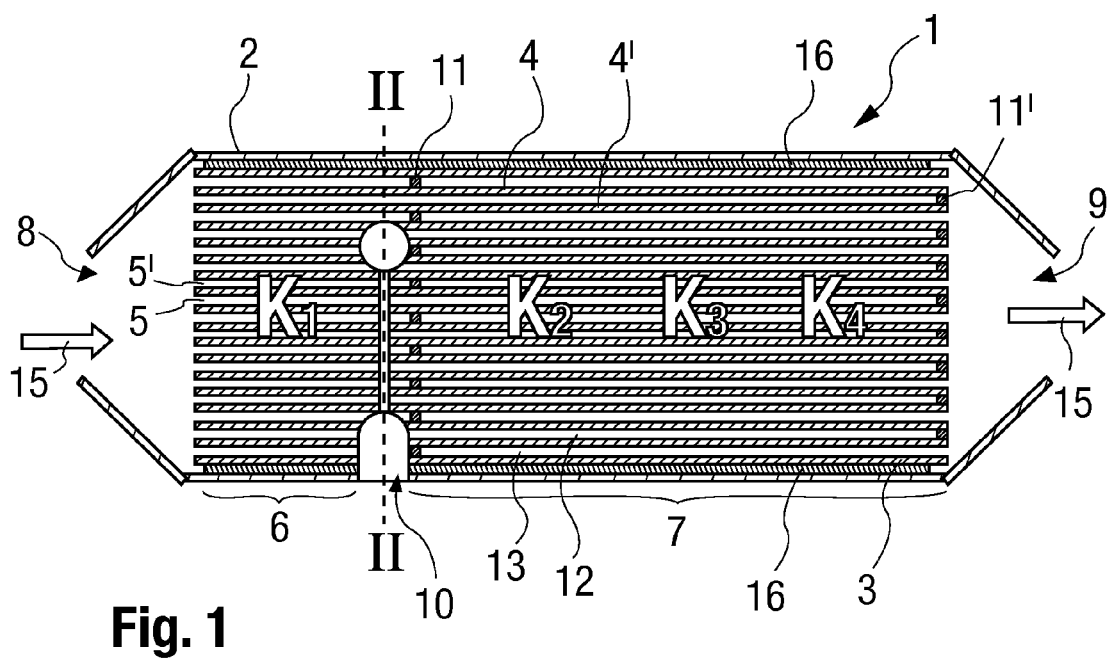
FIG. 1 is a longitudinal sectional view through an exhaust gas-treating device.

Referring to the drawings in particular, according to FIG. 1, an exhaust gas-treating device 1, which can be used in an exhaust system of an internal combustion engine, especially of a motor vehicle, has an insert 3 arranged in a housing 2. This insert 3 is provided with a plurality of ducts 5, 5' surrounded by duct walls 4, 4' and arranged in parallel. Insert 3 can be divided into an inflow-side, first section 6 and an outflow-side, second section 7. The direction of flow of the exhaust gases is indicated by arrows 15 in FIG. 1.

Housing 2 has an inflow opening 8 in the area of the first section 6 and an outflow opening 9 in the area of the second section 7. The exhaust gas-treating device 1 is provided with at least one recess 10 in the form of a hole at the end of the first section 6, which said end is arranged opposite the inflow opening 8.

Ducts 5, 5' are closed in the second section 7 mutually and relative to the second section 7 at the end with closing plugs 11, 11' such that they form a plurality of inlet ducts 12 and a plurality of outlet ducts 13 depending on the arrangement of the closing plugs 11, 11'. One inlet duct 12 each is closed with a closing plug 11' oriented towards the outflow opening 9, whereas one outlet duct 13 each has a closing plug 11 in the transition area from the first section 6 to the second section 7. An inlet duct 12 is thus open oriented towards the inflow opening 8 and closed with a closing plug 11' in the direction of the outflow opening 9, whereas an outlet duct 13 is closed in the transition area from the first section 6 to the second section 7 and is open oriented towards the outflow opening 9. An exhaust gas flow entering the exhaust gas-treating device 1 through the inflow opening 8 will correspondingly flow through the ducts 5, 5' until some of the ducts 5, 5' have a closing plug 11, which prevents the exhaust gas flow from flowing further in these ducts 5. The exhaust gas flow will then pass over in these ducts 5 into the ducts 5' through the duct walls 4, 4' and flow through the inlet ducts 12 up to the closing plug 11' in the area of the outflow opening 9 in order to be subsequently pressed through the duct walls 4, 4' into the outlet ducts 13. The exhaust gas flow finally leaves the outlet ducts 13 in the direction of the outflow opening 9.

An oxidation catalyst coating can be applied to the duct walls 4, 4' of ducts 5, 5' in the first section 6 of insert 3. At least one oxidation catalytic converter K1 is formed by this oxidation catalyst coating in the first section 6. It is possible due to this at least one oxidation catalytic converter K1 to reduce the unburnt hydrocarbon and carbon monoxide contents in the exhaust gas by oxidizing these harmful substances on the oxidation catalytic converter K1 with oxygen.

Recesses 10, through which a reducing agent can be introduced into the exhaust gas-treating device 1 by means of a feed means 17 and/or mixing means 14, are provided at the end of the first section 6. For example, a urea-water solution is preferably injected here by injection nozzles, not shown, as a reducing agent, e.g., depending on the operating point of the internal combustion engine. However, ammonia or, e.g., fuel may also be injected directly into the recesses 10. In case of, e.g., fuel, this is used to regenerate a particle filter K3 arranged after the recesses 10 in the direction of the exhaust gas flow in case of, e.g., fuel if the corresponding ducts, especially the inlet ducts, have a corresponding catalytic coating. The particle filter K3 is heated now on the adapted surface by the exothermal reaction of the fuel with oxygen so intensely that the particle filter K3 can be regenerated by the reaction of the soot particles with oxygen. Besides the reduced space requirement, there also is a very good mixing, e.g., of the urea-water solution due to the injection onto the hot insert 3. Mixing can be supported by a plurality of recesses connected with one another, as is shown in FIG. 2.

Figure 3:
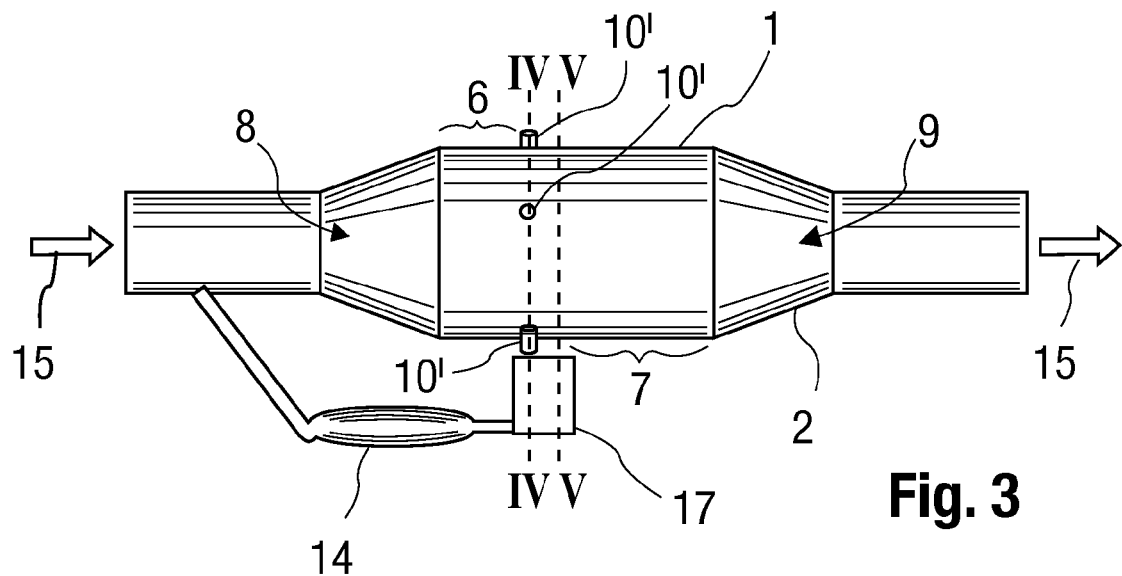
FIG. 3 is a top view of an exhaust gas-treating device with a mixing means for mixing exhaust gas and a reducing agent.

Furthermore, as is shown in FIG. 3, the reducing agent, e.g., a urea-water solution, can also be mixed with exhaust gas branched off from the exhaust gas flow by a mixing means 14 and pressed through the recesses 10, 10' 10" into the insert 3, e.g., after evaporation of the water of the urea-water solution.

Figure 2:
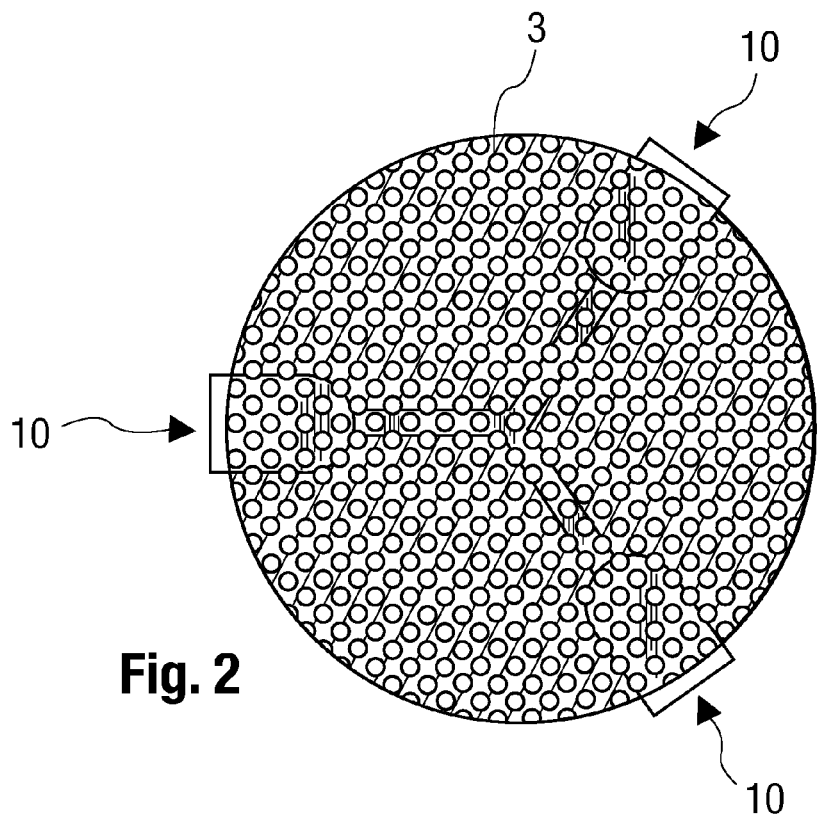
FIG. 2 is a cross sectional view through the exhaust gas-treating device in a section plane II-II according to FIG. 1.
Figure 4:
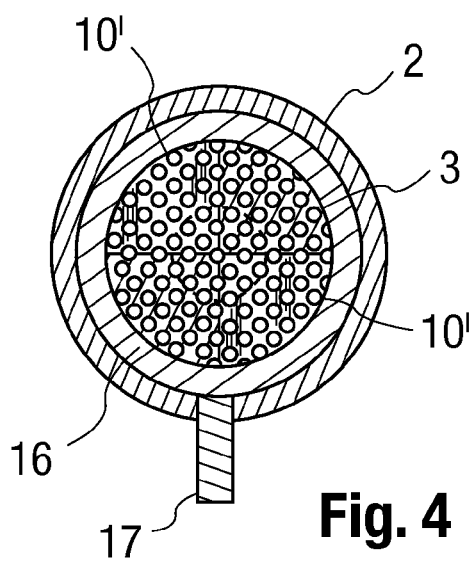
FIG. 4 is a cross sectional view through the exhaust gas-treating device in a section plane IV-IV according to FIG. 3 with two quarter circle-shaped milled recesses.
Figure 5:
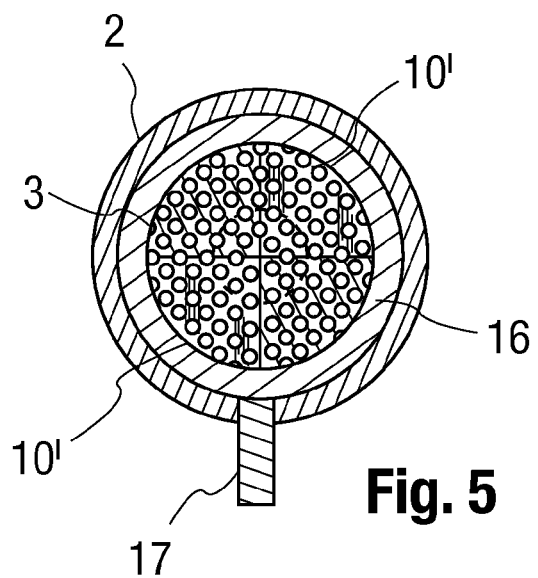
FIG. 5 is a cross sectional view through the exhaust gas-treating device in a section plane V-V according to FIG. 3 with two additional quarter circle-shaped milled recesses.

Not only recesses 10, 10', 10" in the form of a hole 10, as is shown in FIG. 2, are conceivable, but also alternatingly arranged milled recesses 10', 10" according to FIG. 4 or FIG. 5, which follow each other in space in the direction of the exhaust gas flow and completely cover in their entirety the cross section of insert 3.

As is shown in FIG. 4, two recesses 10' in the form of two opposite quarter circles could be arranged in a plane B according to FIG. 3 such that, as is shown in FIG. 5, two recesses 10" together cover all ducts 5, 5' in a plane C according to FIG. 3, likewise in the form of two opposite quarter circles. Due to the type and arrangement of such milled recesses 10', 10", it is possible to distribute the reducing agent introduced, e.g., via the feed means 17 and/or mixing means 14 into the recesses 10', 10" uniformly over all ducts 5, 5'.

As an alternative, such recesses 10', 10" may also have a form other than that of a quarter circle, they may be distributed over more than two planes B, C and, furthermore, also be designed as mutually overlapping recesses.

Figure 6:
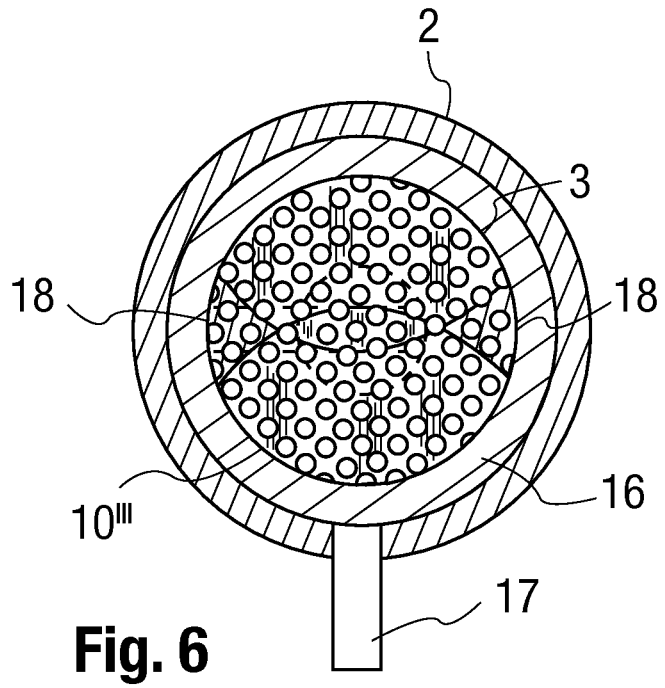
FIG. 6 is a cross sectional view through the exhaust gas-treating device with two circular or spherical lateral incisions.
Figure 7:
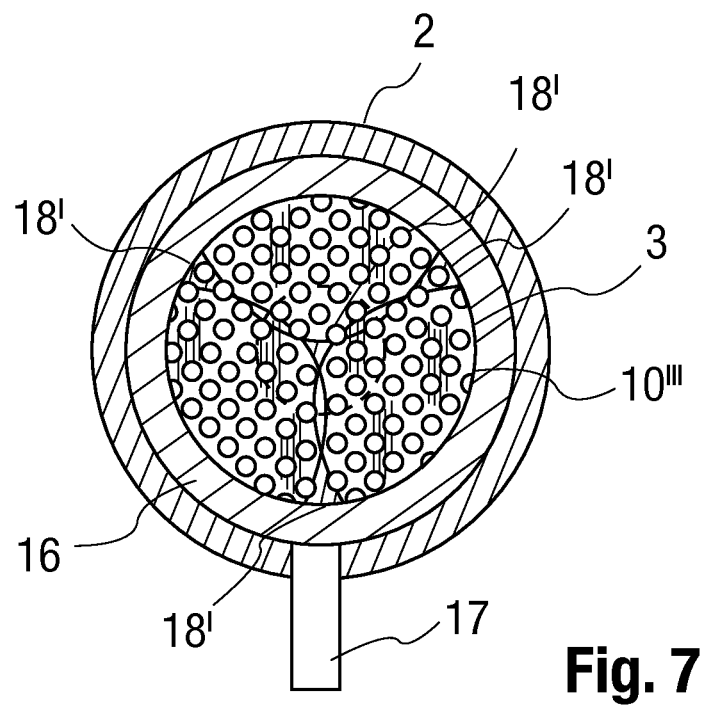
FIG. 7 is a cross sectional view through the exhaust gas-treating device with three circular or spherical lateral incisions.

In a preferred embodiment, recess 10''' is designed, as is shown in FIG. 6 and in FIG. 7, as at least one circular arc-shaped or arc-shaped lateral incision. Such circular or arc-shaped incisions can be prepared in an especially simple manner in terms of manufacturing technology because they can be prepared, e.g., with a side milling cutter or a grinding wheel. Insert 3 is milled once or several times from the outside for this purpose in order to connect the largest possible areas and to leave in place small webs 18, 18' only, which hold the insert 3 together during assembly. A later rupture of these webs 18, 18' and hence disintegration of the insert 3 into two parts does not compromise the function and durability of the exhaust gas-treating device 1. Depending on the arrangement and number of incisions, marginal webs 18, 18' and/or webs 18' located within the insert 3 can be formed.

The duct walls 4, 4' in the inlet ducts 12 are preferably provided with an SCR catalyst coating in the second section 7. This SCR catalyst coating forms at least one SCR catalytic converter K2. This can let the nitrogen oxides occurring in the exhaust gas flow react with the reducing agent introduced into the recesses 10, 10', 10'' such that the nitrogen oxides are reduced. This is preferably brought about with ammonia or a urea-water solution, where the ammonia reacts with the nitrogen oxides to form nitrogen and water.

If the exhaust gas flow entering the inlet ducts 12 is prevented from flowing further by the closing plugs 11' arranged on the outflow side, the exhaust gas flow passes through the duct walls 4, 4'. The duct walls 4, 4' act as a particle filter K3 now, which retains soot particles and fine dusts contained in the exhaust gas. The duct walls 4, 4' preferably have a highly porous, lightweight basic material, e.g., cordierite, aluminum oxide, mullite or aluminum titanate. Due to the highly porous structure, it is possible to apply a higher catalytic activity by means of larger quantities of wash coat. In addition, regeneration of the particle filter K3 by exothermal reactions of fuel or partially burnt products of the fuel with oxygen can be facilitated by a suitable design of the duct walls 4, 4'.

The outlet ducts 13 may in turn be provided with a blocking catalyst coating, which ensures that excess ammonia passing through the SCR catalytic converter K2 is oxidized by the blocking catalytic converter K4, so that the quantity of ammonia in the exhaust gas can be reduced. However, nitrogen oxides may, in turn, be formed by the blocking catalytic converter K4, so that the quantity of ammonia injected should be metered accurately.

In a preferred embodiment, the exhaust gas-treating device 1 has only one insert 3. This insert 3 may comprise a plurality of parts, but it is preferably a one-part insert or is made in one piece and especially consists of a ceramic and/or metallic monolith. An oxidation catalytic converter K1, an SCR catalytic converter K2, a particle filter K3 and a blocking catalytic converter K4 are made integrally in one piece with one another in such an insert 3 and such an insert may have, moreover, at least one recess 10, 10', 10'' to receive a feed means 17 or a mixing means 14.

Such a one-part insert 3 preferably has a first section 6 designed as an oxidation catalytic converter K1 and a second section 7 designed as an SCR catalytic converter K2, particle filter K3 and blocking catalytic converter K4. Both sections 6, 7 are preferably in one piece or as a monolith with one another. The two sections 6, 7 may also be individually monolithic and fastened to one another. The recesses 10, 10', 10'' may be done away with in this case and section 6 may be connected to section 7 via a coupling piece, not shown in the figures. Such a coupling piece may assume the function of the recesses 10, 10', 10''. As a result, the insert can be manufactured in a simpler manner and, on the other hand, the recesses 10, 10', 10'', which can be prepared with difficulty and reduce the stability of the insert, can be done away with.

Insert 3 is preferably mounted in only one housing 2 by means of only one mounting means 16, e.g., in the form of a mounting mat. The exhaust gas flows through the one-part insert 3 in an exhaust gas flow direction 15 without the exhaust gas having to be deflected in the housing in order to be able to be sent to the next catalyst component. The catalyst components may now be arranged axially one after another in a tubular housing 2.

The closing plugs 11, which close the outlet ducts 13 on the inflow side, are located axially at spaced locations from the inflow opening 17 of insert 3 in case of a one-part insert 3.

While specific embodiments of the invention have been described in detail to illustrate the application of the principles of the invention, it will be understood that the invention may be embodied otherwise without departing from such principles.

What is claimed is:

1. An exhaust gas-treating device for an exhaust system of an internal combustion engine, the exhaust gas-treating device comprising:
   a particle filter;
   an oxidation catalytic converter arranged upstream of the particle filter with respect to a direction of an exhaust gas flow; and
   an insert with a plurality of ducts for parallel flow therethrough, said insert having an inflow-side with a first section with an oxidation catalyst coating to form said oxidation catalytic converter and having an outflow-side with a second section forming said particle filter, said second section having inlet ducts closed on an the outflow side and having outlet ducts closed on an inflow side of said second section after said first section;
   at least some of said inlet ducts have a duct surface at least partly provided with an SCR (Selective Catalytic Reduction) catalyst coating, forming at least one SCR catalytic converter reducing nitrous oxides in the exhaust gas by in combination with the reducing agent;
   at least some of the outlet ducts provided at least partly with a blocking catalyst coating, which forms at least one blocking catalytic converter for decomposing the reducing agent, said blocking catalyst coating being different than said SCR catalyst coating.

2. An exhaust gas-treating device in accordance with claim 1, wherein the outlet ducts are closed on the inflow side by plugs located at spaced locations from the respective inflow opening.

3. An exhaust gas-treating device in accordance with claim 1, wherein the second section forms at least one said SCR catalytic converter and at least one said particle filter and at least one said blocking catalytic converter, with said SCR catalytic particle filter and said blocking catalytic converter forming an integral second section.

4. An exhaust gas-treating device in accordance with claim 3, wherein at least one of said oxidation catalytic converter, said SCR catalytic converter said particle filter and said blocking catalytic converter are formed integrally in said insert.

5. An exhaust gas-treating device in accordance with claim 1, further comprising a feed means for feeding the reducing agent to the insert.

6. An exhaust gas-treating device in accordance with claim 5, wherein said first section of said insert has a lateral recess, said feed means introducing the reducing agent or a reducing agent-exhaust gas mixture to said lateral recess.

7. An exhaust gas-treating device in accordance with claim 6, wherein said lateral recess comprises a hole or milled recess that is one of circular or arc-shaped milled.

8. An exhaust gas-treating device in accordance with claim 1, wherein the first section and/or the second section and/or the entire insert is made in one piece and/or is a monolith.

9. An exhaust gas-treating device in accordance with claim 1, further comprising a carrier substrate formed of cordierite and/or aluminum oxide and/or mullite and/or aluminum titanate.

10. An exhaust gas-treating device in accordance with claim 1, further comprising a mixing means connected as a feed means or via a feed means to the exhaust gas-treating device and/or connected to an exhaust gas pipe along an exhaust gas flow direction upstream of the exhaust gas-treating device.

11. An exhaust gas-treating device in accordance with claim 1, wherein the one-part insert is surrounded by a housing and/or is held in the housing by a mounting means, especially by a mounting mat.

12. An exhaust gas-treating device for an exhaust system of a motor vehicle internal combustion engine, the exhaust gas-treating device comprising:
 a particle filter element forming a particle filter with inlet ducts closed on an outflow side and with outlet ducts closed on an inflow side;
 an oxidation catalytic converter arranged in an exhaust gas flow direction upstream of the particle filter;
 a feed means for feeding a reducing agent only after said oxidation catalytic converter and into said inlet ducts;
 a SCR catalytic converter formed by at least some of said inlet ducts being provided at least partly with an SCR catalyst coating forming at least one SCR catalytic converter for decomposing the reducing agent;
 said particle filter element being porous and being an integral part of an insert with a plurality of ducts for parallel flow therethrough, said ducts including said particle filter inlet ducts and said particle filter outlet ducts, said insert having an inflow-side with a first section with ducts at last partially having an oxidation catalyst coating to form said oxidation catalytic converter and having an outflow-side with a second section forming said particle filter element, said second section having said inlet ducts closed on the outflow side and having outlet ducts closed on the inflow side of said particle filter element.

13. An exhaust gas-treating device in accordance with claim 12, wherein the outlet ducts are closed on the inflow side by plugs located at spaced locations from the respective inflow opening.

14. An exhaust gas-treating device in accordance with claim 12, wherein at least some of the outlet ducts are provided at least partly with a blocking catalyst coating, which forms at least one blocking catalytic converter for decomposing the reducing agent.

15. An exhaust gas-treating device in accordance with claim 14, wherein the second section forms said SCR catalytic converter and said particle filter and said blocking catalytic converter, said SCR catalytic particle filter and said blocking catalytic converter forming an integral second section.

16. An exhaust gas-treating device in accordance with claim 12, wherein at least one of said oxidation catalytic converter, said SCR catalytic converter said particle filter and said blocking catalytic converter are formed integrally as part of a single piece insert.

17. An exhaust gas-treating device in accordance with claim 12, wherein said insert has lateral recess, said feed means introducing a reducing agent or a reducing agent-exhaust gas mixture to said lateral recess.

18. An exhaust gas treating device comprising:
 an insert having a plurality of walls defining a plurality of axial ducts for parallel flow of exhaust gas from an inlet side to an outflow side of the insert, said axial ducts being radially spaced from each other by said walls, said insert having a first section adjacent said inflow-side and having a second section adjacent said outflow-side, said plurality of ducts including inlet ducts closed on said outflow side, said plurality of ducts including outlet ducts in said second section, said outlet ducts being closed on an upstream side of said second section and downstream of said first section, said insert being formed of a material to form a particle filter as the exhaust gas flows through said walls from said inlet ducts to said outlet ducts;
 an oxidation catalyst coating on said walls of said first section of said insert to form an oxidation catalytic converter;
 a feed device feeding a reducing agent into the exhaust gas only after said first section and into said inlet ducts of said second section;
 an inlet catalyst coating on said walls of said second section which define said inlet ducts, said inlet catalyst coating forming a catalytic converter;
 a blocking catalyst coating on said walls of said second section which define said outlet ducts, said blocking catalyst coating forming a blocking catalytic converter for decomposing the reducing agent.

19. An exhaust gas-treating device in accordance with claim 18, wherein:
 said inlet catalytic converter is an SCR catalytic converter using ammonia from the reducing agent to reduce nitrous oxides in the exhaust gas;
 said blocking catalytic converter decomposes ammonia from the reducing agent, said blocking catalyst coating being different than said SCR catalyst coating.

20. An exhaust gas-treating device in accordance with claim 18, wherein:
 said insert defines a radial recess between said first and second sections;
 said feed device feeds the reducing agent only into said radial recess between said first and second sections.

21. An exhaust gas-treating device in accordance with claim 20, wherein:
 said radial recess only partially extends through said insert.

* * * * *